United States Patent
Sun et al.

(10) Patent No.: US 12,346,838 B1
(45) Date of Patent: Jul. 1, 2025

(54) AUTONOMOUS DRIVING TEST METHOD BASED ON MULTI-AGENT SWARM ADVERSARIAL, DEVICE AND MEDIUM

(71) Applicant: TONGJI UNIVERSITY, Shanghai (CN)

(72) Inventors: Jian Sun, Shanghai (CN); Peng Hang, Shanghai (CN); Shiyu Fang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 19/074,465

(22) Filed: Mar. 10, 2025

(30) Foreign Application Priority Data

Jun. 7, 2024 (CN) .......................... 202410736612.0

(51) Int. Cl.
*G06N 7/01* (2023.01)
*G06N 3/006* (2023.01)
(Continued)

(52) U.S. Cl.
CPC ............... *G06N 7/01* (2023.01); *G06N 3/006* (2013.01); *B60K 2360/175* (2024.01);
(Continued)

(58) Field of Classification Search
CPC .......... G06N 7/01; G06N 3/006; G06N 3/092; G06N 3/094; G06N 20/00; B60K 2360/175; B60Q 2800/10; G05B 2219/39146
See application file for complete search history.

(56) References Cited

U.S. PATENT DOCUMENTS 10,137,896 B2 * 11/2018 Zhuang ............... B60W 30/095
12,175,767 B2 * 12/2024 Yu .......................... G06V 20/58
(Continued)

OTHER PUBLICATIONS

Malawade et al., "Spatio-Temporal Scene-Graph Embedding for Autonomous Vehicle Collision Prediction" Jan. 6, 2022, IEEE, pp. 9379-9388. (Year: 2022).*
(Continued)

*Primary Examiner* — Miranda M Huang
*Assistant Examiner* — Chase P. Hinckley
(74) *Attorney, Agent, or Firm* — JCIPRNET

(57) ABSTRACT

The present invention relates to an autonomous driving test method based on multi-agent swarm adversarial, a device and a medium. The method includes: deducing a conflict topological relationship graph between a tested autonomous vehicle and an agent; deducing a feasible planning space of the tested autonomous vehicle according to the conflict topological relationship graph; establishing a multi-agent swarm adversarial model based on a potential game under the feasible planning space according to a correlation between an individual reward of the agent and a swarm adversarial test effect of a multi-agent system, and solving and obtaining an optimal adversarial strategy of the multi-agent system against the tested autonomous vehicle, wherein in the multi-agent swarm adversarial model, an adversarial intensity is introduced, and the adversarial intensity is adaptively adjusted according to an actual response of the tested autonomous vehicle; and repeatedly executing the S1-S3 until an adversarial task is completed.

15 Claims, 3 Drawing Sheets

(51) Int. Cl.
   *G06N 3/092* (2023.01)
   *G06N 3/094* (2023.01)
   *G06N 20/00* (2019.01)

(52) U.S. Cl.
   CPC .............. *B60Q 2800/10* (2022.05); *G05B 2219/39146* (2013.01); *G06N 3/092* (2023.01); *G06N 3/094* (2023.01); *G06N 20/00* (2019.01)

(56) References Cited

U.S. PATENT DOCUMENTS

| | | | |
|---|---|---|---|
| 2023/0230484 A1* | 7/2023 | Al Faruque | G06V 10/82 |
| 2024/0149891 A1* | 5/2024 | Miyazaki | B60W 60/00186 |
| 2024/0217549 A1* | 7/2024 | Martin | B60W 60/00274 |

OTHER PUBLICATIONS

Liu et al., "MTD-GPT: A Multi-Task Decision-Making GPT Model for Autonomous Driving at Unsignalized Intersections" Jul. 30, 2023, arXiv: 2307.16118v1, pp. 1-8. (Year: 2023).*

Zhang et al., "GraphAD: Interaction Scene Graph for End-to-end Autonomous Driving" Apr. 7, 2024, arXiv: 2403.19098v2, pp. 1-17. (Year: 2024).*

Wen et al., "On the Road with GPT-4V(ision): Early Explorations of Visual-Language Model on Autonomous Driving" Nov. 28, 2023, arXiv: 2311.05332v2, pp. 1-42. (Year: 2023).*

Li et al., "Graph-based Topology Reasoning for Driving Scenes" Aug. 28, 2023, arXiv: 2304.05277v2, pp. 1-12. (Year: 2023).*

Liu et al., "Dynamic-Scene-Graph-Supported Visual Understanding of Autonomous Driving Scenarios" Jun. 3, 2024, IEEE, pp. 82-91. (Year: 2024).*

Singhal et al., "Real-time Control of Electric Autonomous Mobility-on-Demand Systems via Graph Reinforcement Learning" Apr. 4, 2024, arXiv: 2311.05780v2, pp. 1-9. (Year: 2024).*

Zhang et al., "On Adversarial Robustness of Trajectory Prediction for Autonomous Vehicles" Aug. 22, 2022, arXiv: 2201.05057v3, pp. 1-13. (Year: 2022).*

Xin et al., "Efficient Real-time Path Planning with Self-evolving Particle Swarm Optimization in Dynamic Scenarios" Dec. 24, 2023, arXiv: 2308.10169v2, pp. 1-11. (Year: 2023).*

Fang et al., "Abductive Ego-View Accident Video Understanding for Safe Driving Perception" Mar. 1, 2024, arXiv: 2403.00436V1, pp. 1-19. (Year: 2024).*

Meyer et al., "Geometric Deep Learning for Autonomous Driving: Unlocking the Power of Graph Neural Networks with CommonRoad-Geometric" Apr. 24, 2023, arXiv: 2302.01259v2, pp. 1-8. (Year: 2023).*

Peng et al., "LaneGraphZSeq: Lane Topology Extraction with Language Model via Vertex-Edge Encoding and Connectivity Enhancement" Feb. 19, 2024, arXiv: 2401.17609v2, pp. 1-9. (Year: 2024).*

Wu et al., "Prospective Role of Foundation Models in Advancing Autonomous Vehicles" May 17, 2024, arXiv: 2405.02288v2, pp. 1-45. (Year: 2024).*

Fu et al., "Drive Like a Human: Rethinking Autonomous Driving with Large Language Models" Jul. 14, 2023, arXiv: 2307.07162v1, pp. 1-11. (Year: 2023).*

Chen et al., "Sparse Attention Graph Convolution Network for Vehicle Trajectory Prediction" Dec. 18, 2023, pp. 1-15. (Year: 2023).*

Cai et al., "Adversarial Stress Test for Autonomous Vehicles via Series Reinforcement Learning Tasks with Reward Shaping" Jan. 2024, pp. 1-16. (Year: 2024).*

* cited by examiner

AUTONOMOUS DRIVING TEST METHOD BASED ON MULTI-AGENT SWARM ADVERSARIAL, DEVICE AND MEDIUM

CROSS-REFERENCE TO RELATED APPLICATION

This application claims the priority benefit of China application serial no. 202410736612.0, filed on Jun. 7, 2024. The entirety of each of the above-mentioned patent applications is hereby incorporated by reference herein and made a part of this specification.

FIELD OF TECHNOLOGY

The present invention relates to the technical field of autonomous driving testing, and in particular to an autonomous driving test method based on multi-agent swarm adversarial, a device and a medium.

BACKGROUND

With the increasing maturity of autonomous driving technology, intelligent connected vehicles have officially entered the second half dominated by commercial implementation, from the first half focusing on early-stage technological competition. However, in complex interactive environments, autonomous vehicles still exhibit overly conservative behavior, indicating that the capabilities of current autonomous vehicles in high-density environments still need further improvement and testing.

At present, the test of autonomous vehicles often involves a relatively small number of environmental vehicles, and the ability of autonomous vehicles is generally tested only by fault injection into single-vehicle environmental vehicles. The dangerous scenarios obtained by this method not only scarcely exist in the real world, but also fail to take into account that driving tasks on open roads are often affected by the coupling of multiple objects. This leads to inaccurate and untrustworthy test results for autonomous vehicles, and further causes the current autonomous vehicles to exhibit a "lack of adaptability" on open roads.

SUMMARY

An objective of the present invention is to provide an autonomous driving test method based on multi-agent swarm adversarial, a device and a medium in order to overcome the above deficiencies existing in the prior art, so as to realize swarm adversarial with a dynamically adjustable adversarial intensity, and fully test the decision-making ability of autonomous vehicles in complex interactive scenarios.

The objective of the present invention can be achieved by the following technical solutions:

According to a first aspect of the present invention, an autonomous driving test method based on multi-agent swarm adversarial is provided, including steps of:

step S1. deducing a conflict topological relationship graph between a tested autonomous vehicle and an agent according to a road topology of a test scenario and a conflict relationship of test objects;

step S2. deducing a feasible planning space of the tested autonomous vehicle according to the conflict topological relationship graph;

step S3. establishing a multi-agent swarm adversarial model based on a potential game under the feasible planning space according to a correlation between an individual reward of the agent and a swarm adversarial test effect of a multi-agent system, and solving and obtaining an optimal adversarial strategy of the multi-agent system against the tested autonomous vehicle, where in the multi-agent swarm adversarial model, an adversarial intensity is introduced to characterize relative weights of the individual reward of the agent and the swarm adversarial test effect of the multi-agent system, and the adversarial intensity is adaptively adjusted according to an actual response of the tested autonomous vehicle; and step S4. repeatedly executing the steps S1-S3 until an adversarial task is completed.

Preferably, the step S1 specifically includes:

deducing whether a spatial conflict exists between the tested autonomous vehicle and a multi-agent in an environment, and among multi-agents, based on vehicle state information of a multi-agent vehicle group {Veh1, Veh2 ... Vehn} and the tested autonomous vehicle Veh0, and test map information; and adopting graph theory to describe a topological relationship of a vehicle conflict to obtain conflict topological relationship graph G=(V,E) of the tested autonomous vehicle and the agent, where V represents a set of vehicles, vehicle Vehn had a position of $p_n=(x_n(t),y_n(t))$ and a speed of $v_n(t)$ at time t; and E represents a set of edges, for edge $e_{i,j}$, an inference is made according to current position $p_i$ of vehicle Vehi and current position $p_j$ of vehicle Vehj, and if a spatial conflict exists, then the edge is recorded as $e_{ij}=1$, and otherwise, the edge is recorded as 0.

Preferably, the step S2 specifically includes: reducing a two-dimensional conflict problem to a one-dimensional car-following problem through a virtual lane projection method according to the conflict topological relationship graph, and deducing a feasible planning space of the tested autonomous vehicle under adversarial of the multi-agent system to characterize the feasible planning space of the tested autonomous vehicle under a current conflict topological relationship by establishing a relationship between longitudinal motion of the vehicle and time.

Preferably, in the step S3, for the establishing a multi-agent swarm adversarial model based on a potential game under the feasible planning space according to a correlation between the individual reward of the agent and a swarm adversarial test effect of the multi-agent system, an expression is:

$$\frac{R_i(a_i^x, p_i, p_0) - R_i(a_i^0, p_i, p_0)}{P(a_i^x, p_i, p_0) - P(a_i^0, p_i, p_0)} > 0, \forall x \in U, \forall i \in V$$

where in the expression: $P(a_i^x, p_i, p_0)$ represents a swarm adversarial effect of a multi-agent system of agent i when an adversarial strategy is $a_i^x$, U is the feasible planning space, and V is a set of multi-agent vehicle groups; $P(a_i^0, p_i, p_0)$ represents a swarm adversarial effect of the multi-agent system of the agent i under any initial adversarial strategy; $R_i(a_i^x, p_i, p_0)$ represents an individual reward of the agent i when an adversarial strategy is $a_i^x$, and $R_i(a_i^0, p_i, p_0)$ represents an individual reward of the agent i under an initial adversarial strategy; and $a_i$ is an acceleration of the agent i, $p_i$ is a position of the agent i, and $p_0$ is a position of the tested autonomous vehicle.

Preferably, in the step S3, for the individual reward of the agent, a function expression is:

$$R_i(a_i, p_i, p_0) = [r_{self,i}^t(a_i, p_i), r_{group,i0}^t(a_i, p_i, p_0)]\theta$$

$$r_{self,i}^t(a_i, p_i) = a_i - d_{des,i}^t - j_i^t$$

$$r_{group,i0}^t(a_i, p_i, p_0) = \Delta TTCP_{i0}^t = \left|\frac{d_{cp,0}^t}{v_0^t} - \frac{d_{cp,i}^t}{v_i^t}\right|$$

where in the expression: $r_{self,i}^t(a_i, p_i)$ represents a driving reward of the agent i at the time t, $a_i$ is the acceleration of the agent i, $p_i$ is the position of the agent i, $d_{des,i}^t$ is a distance between the agent i and an end point, and $j_i^t$ is a jerk of the agent i; $r_{group,i0}^t(a_i, p_i, p_0)$ represents an adversarial reward of the agent i at the time t, $\Delta TTCP_{i0}^t$ represents a time difference between the agent i and the tested autonomous vehicle Veh0 reaching a conflict point at the time t, $d_{cp,i}^t$ represents a distance between the agent i and the conflict point, $v_i^t$ represents a speed of the agent i, $d_{cp,0}^t$ represents a distance between the tested autonomous vehicle and the conflict point, $v_0^t$ represents a speed of the tested autonomous vehicle, and $p_0$ is the position of the tested autonomous vehicle; and $\theta$ is the adversarial intensity, characterized by adopting relative weights of the individual reward of the agent and the swarm adversarial test effect of the multi-agent system; and for the swarm adversarial test effect of the multi-agent system, a function expression is:

$$P = \sum_{Y^t}^{t+T} Y^t \sum_{i \in V}(\varphi_i[r_{self,i}^t(a_i, p_i), r_{group,i0}^t(a_i, p_i, p_0)]\theta)$$

where in the expression: $\gamma$ represents a reward reduction coefficient; T is a planning step size; and $\varphi_i$ is a contribution generated by the agent i in adversarial.

Preferably, for the contribution generated by the agent i in the adversarial $\varphi_i$, a calculation expression is:

$$\varphi_i = \sum_{i \in c, c \in V} \frac{(c-1)(V-c)!}{V!}(P(c) - P(c - \{i\}))$$

where in the expression: c represents a possible combination form of the agent i in the multi-agent system, and $P(c)-P(c-\{i\})$ represents a marginal utility generated by the agent i in the combination c.

Preferably, the adversarial intensity $\theta$ adaptively and dynamically updates the relative weights using a back-propagation update algorithm, and an update expression is:

$$\theta^t = \theta^{t-1} - \mu \frac{\partial(\hat{P} - P)}{\partial \theta^{t-1}}$$

where in the expression: $\theta^{t-1}$ is an adversarial intensity at time t−1, $\mu$ represents an update rate of the adversarial intensity, and $\hat{P}$ is an estimated effect when the tested autonomous vehicle faces swarm adversarial.

Preferably, in the step S3, a sequential quadratic programming method is adopted to solve and obtain a Nash equilibrium optimal adversarial strategy of the multi-agent system against the tested autonomous vehicle.

According to a second aspect of the present invention, an electronic device is provided, including a memory and a processor, the memory having a computer program stored thereon, where the processor, when executing the program, implements the method according to any one of the above.

According to a third aspect of the present invention, a computer-readable storage medium is provided, having a computer program stored thereon, where the program, when executed by a processor, implements the method according to any one of the above.

DESCRIPTION OF THE EMBODIMENTS

The following will provide a clear and complete description of technical solutions in embodiments of the present invention, in conjunction with the accompanying drawings in the embodiments of the present invention. Obviously, the described embodiments are part of the embodiments, not all of the embodiments in the present invention. Based on the embodiments in the present invention, all other embodiments obtained by those of ordinary skill in the art without creative labor shall fall within the scope of protection of the present invention.

Embodiments

Figure 1:
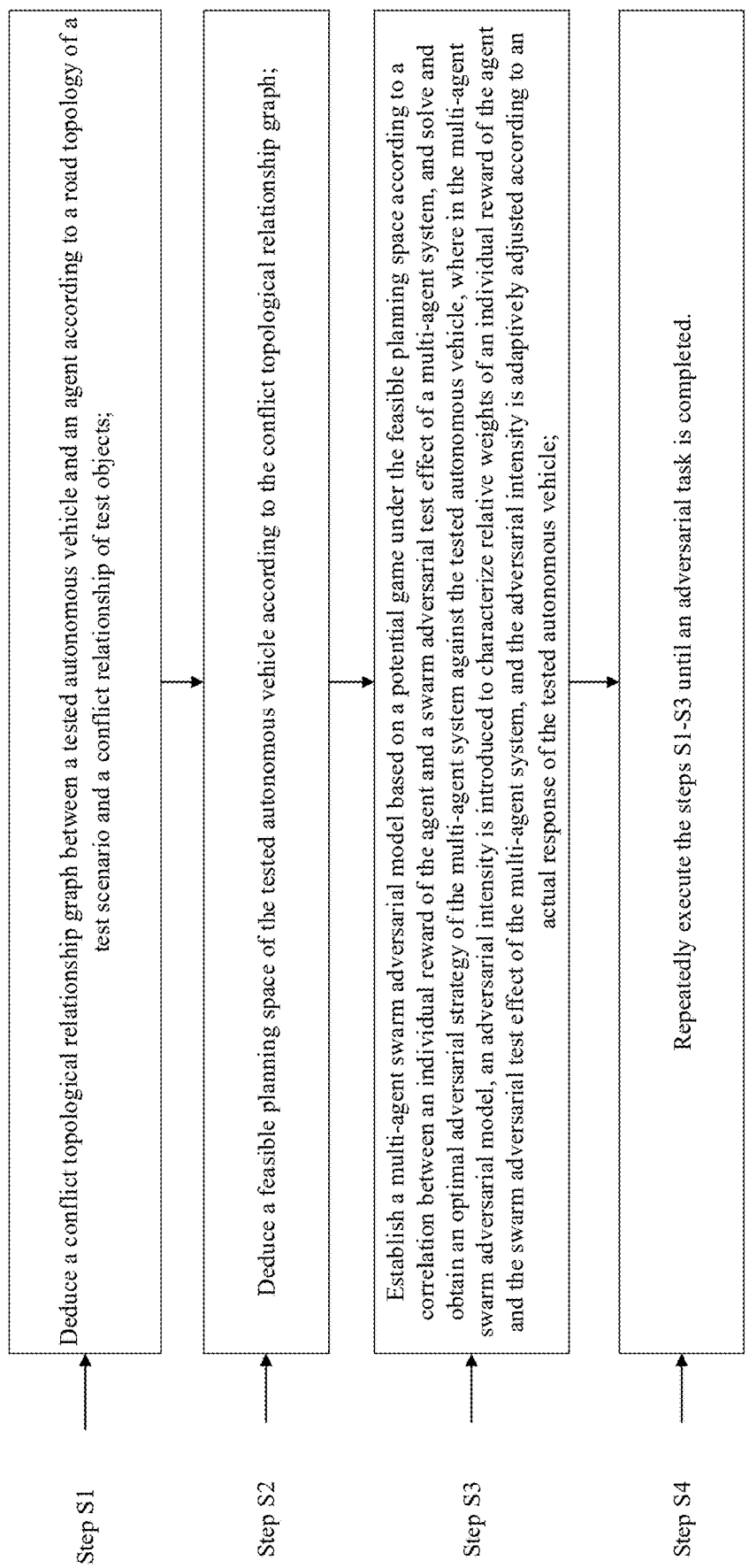
FIG. 1 is an overall flowchart of the present invention.
Figure 2:
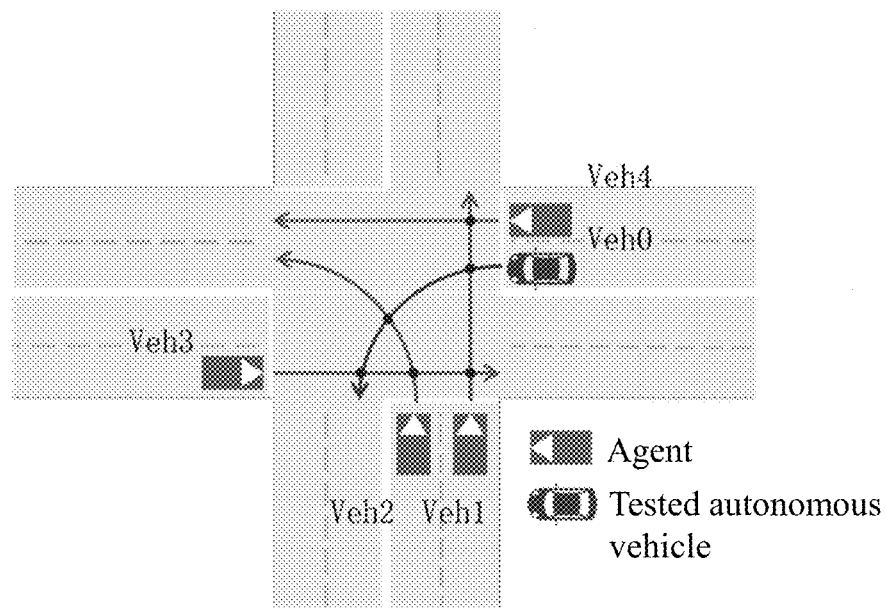
FIG. 2 is a schematic diagram of initial vehicle states and a test environment in an example of the present invention.
Figure 3:
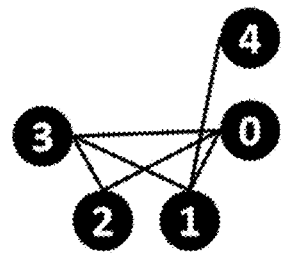
FIG. 3 is a schematic diagram of a conflict topological relationship in an example of the present invention.
Figure 4:
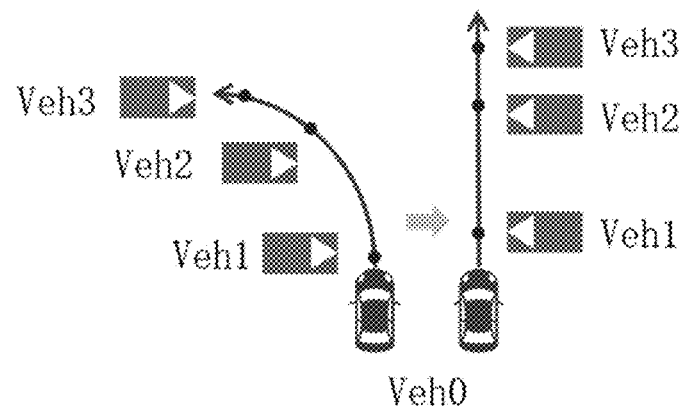
FIG. 4 is a schematic diagram of virtual lane projection in an embodiment of the present invention.
Figure 5:
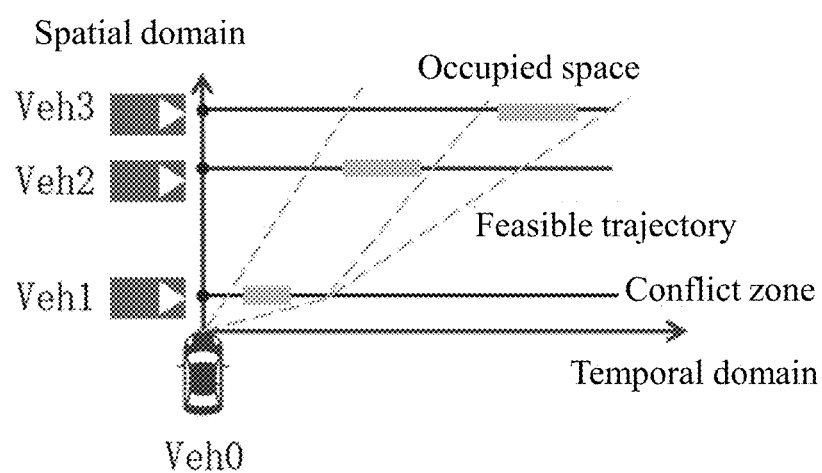
FIG. 5 is a schematic diagram of a spatio-temporal feasible planning space of a tested autonomous vehicle in an example of the present invention.

This embodiment provides an autonomous driving test method based on multi-agent swarm adversarial, including the following steps:

initializing a test scenario. At the beginning of the test, the vehicle state information of multi-agent vehicle group {Veh1, Veh2 . . . Veh4} and tested autonomous vehicle Veh0 is initialized, as shown in FIG. 2, and the multi-agent vehicle group and the tested autonomous vehicle are started.

step 1: establishing a conflict topological relationship graph.

step 11: deducing whether a spatial conflict exists between the tested autonomous vehicle and a multi-agent in an environment, and among multi-agents, based on the vehicle state information of a multi-agent vehicle group {Veh1, Veh2 . . . Vehn} and the tested autonomous vehicle Veh0, and test map information.

step 12: describing a vehicle conflict topological relationship based on graph theory. V represents the set of vehicles. For vehicle Vehn, its position is $p_n=(x_n(t), y_n(t))$, and its speed is $v_n(t)$ at time t, and E represents the set of edges, which is an adjacency matrix of n×n, for vehicles Vehi and Vehj, an inference is made according to their current positions $p_i$ and $p_j$, if a conflict exists, the edge is recorded as $e_{ij}=1$, and otherwise, the edge is recorded as 0, and the conflict relationship of vehicles can further be obtained. Finally, G=(V,E) can be used to describe the conflict relationship of vehicles, as shown in FIG. 3.

step 2: modeling the spatio-temporal feasible planning space of the tested autonomous vehicle.

step 21: considering that under the conflict of multiple traffic flows, it is often necessary to consider the lateral and longitudinal trajectory planning of vehicles at the same time, this problem, as a non-convex problem, has high computational complexity and large computational volume. Therefore, the method of virtual lane projection is introduced here. According to the conflict topological relationship of vehicles, a two-dimensional vehicle conflict is reduced to the longitudinal planning of a one-dimensional scenario, which greatly simplifies the computational amount and ensures the real-time adversarial requirement. As shown in FIG. 4, since Veh4 is not connected with the tested vehicle Veh0 in the conflict topological graph, virtual projection is not performed, and according to the sequence of conflict points on the planned trajectories of Veh1, Veh2 and Veh3 and the tested vehicle Veh0, Veh1, Veh2 and Veh3 are projected onto the longitudinal planning line of Veh0 in order.

step 22: establishing the correlation between the longitudinal movement of the tested autonomous vehicle and time according to the position and speed information of the tested autonomous vehicle, and inferring the feasible planning space of the tested autonomous vehicle by combining the result of the virtual lane projection and the vehicles in the multi-agent system. As shown in FIG. 5, in this embodiment, the tested autonomous vehicle Veh0 successively conflicts with Veh1, Veh2 and Veh3, and its feasible planning space must avoid the spaces already occupied by the above agents.

step 3: modeling multi-agent swarm adversarial.

step 31: establishing the individual reward of an agent, where the individual reward of the agent mainly includes two parts, and the specific form is as follows:

$$R_i(a_i, p_i, p_0) = [r^t_{self,i}(a_i, p_i), r^t_{group,i0}(a_i, p_i, p_0)]$$

$$r^t_{self,i}(a_i, p_i) = a_i - d^t_{des,i} - j^t_i$$

$$r^t_{group,i0}(a_i, p_i, p_0) = \Delta TTCP^t_{i0} = \left| \frac{d^t_{cp,0}}{v^t_0} - \frac{d^t_{cp,i}}{v^t_i} \right|$$

where $R_{vehi}$ represents the individual reward of agent i, mainly including driving reward $r_{self,i}^t(a_i, p_i)$ and adversarial reward $r_{group,ij}^t(a_i, p_i, p_0)$ at time t. The driving reward $r_{self,i}^t(a_i, p_i)$ mainly includes two aspects: efficiency and comfort. $a_i$ and $d_{des,i}^t$ are the acceleration of the agent and the distance from the end point, respectively, characterizing the efficiency of the driving process. $j_i^t$ is the jerk of the agent, characterizing the comfort of the driving process. The adversarial reward $r_{group,ij}^t(a_i, p_i, p_0)$ means that the agent can obtain a reward from the adversarial with the tested autonomous vehicle, and specifically means that the smaller the time difference $\Delta TTCP_{i0}^t$ between the agent and the tested autonomous vehicle Veh0 reaching the conflict point, the more severe the conflict is. At this time, the agent can obtain a reward from the adversarial, $d_{cp,i}^t$ represents the distance between the agent and the conflict point, and $v_i^t$ represents the current speed of the agent.

step 32: establishing a function for the swarm adversarial test effect of the multi-agent system. After obtaining the individual reward of the agent, a joint reward equation of the individual reward of the agent and the adversarial test effect P of the multi-agent system swarm is established through a potential game model. First, a potential game is defined as follows:

$$\frac{R_i(a_i^x, p_i, p_0) - R_i(a_i^0, p_i, p_0)}{P(a_i^x, p_i, p_0) - P(a_i^0, p_i, p_0)} > 0, \forall x \in U, \forall i \in V$$

where $P(a_i^x, p_i, p_0)$ represents the adversarial effect of the multi-agent system when the adversarial strategy of the agent i is $a_i^x$, and U is the feasible planning space. When the individual reward of the agent and the adversarial effect of the multi-agent system satisfy the above inequality, it is considered that the adversarial between the multi-agent system and the tested autonomous vehicle can be called a potential game problem.

Further, the function for the swarm adversarial test effect of the multi-agent system is as follows:

$$P = \sum_{t}^{t+T} \gamma^t \sum_{i \in V} \left( \varphi_i [r^t_{self,i}(a_i, p_i) + r^t_{group,i0}(a_i, p_i, p_0)] \right)$$

where $\gamma^t$ represents a reward reduction coefficient, characterizing the preference relationship of the agent between a recent reward and a future reward.

step 33: solving a Nash equilibrium optimal adversarial strategy. After obtaining the objective function of the adversarial effect of the multi-agent system, considering that the problem has an absolute value term, it is a non-convex optimization problem, which is suitable for being solved by a sequential quadratic programming method. The main steps include: transforming an objective function and constraint conditions into a continuously differentiable form, calculating the objective function and its gradient, and the constraint conditions and their Jacobian matrix; in each iteration, solving a convex optimization subproblem to update the current solution according to the current solution and the gradient information of the objective function; and in each iteration, checking whether the amount of change in the value of the objective function is less than a preset convergence tolerance. If the amount of change is less than the tolerance, the algorithm is considered to have converged, and finally, the Nash equilibrium optimal adversarial strategy of the multi-agent system against the tested autonomous vehicle is obtained.

step 4: dynamically adjusting an adversarial intensity.

step 41: quantitatively characterizing the adversarial intensity. In the establishment of the individual reward of the agent in the step 31, the reward mainly includes two parts: driving reward and adversarial reward. Relative weight θ is introduced to represent the preference of the agent in the driving reward and the adversarial reward. When the weight corresponding to the adversarial reward is relatively high, the main goal of the agent shifts from leaving the test scenario quickly and safely to generating a stronger adversarial with the tested autonomous vehicle. Therefore, the formulas for the individual reward of the agent and the adversarial effect function of the multi-agent system are updated as follows:

$$R_t(a_i, p_i, p_0) = [r^t_{self,i}(a_i, p_i), r^t_{group,i0}(a_i, p_i, p_0)]\theta$$

$$P = \sum_{t}^{t+T} \gamma^t \sum_{i \in V} (\varphi_i [r^t_{self,i}(a_i, p_i), r^t_{group,i0}(a_i, p_i, p_0)]\theta)$$

By adjusting the relative weight θ, the tests of different adversarial intensities can be realized, and further the decision-making ability of the tested autonomous vehicle in the face of different situations is examined.

step 42: identifying key agents. There are certain key agents in the multi-agent system, which have a strong conflict with the tested autonomous vehicle. By calculating the marginal utility of the vehicle, the contribution of each agent in the swarm system in the adversarial is obtained. By enhancing the adversarial intensity of the key agents, the feasible planning space of the tested autonomous vehicle in the step 2 can be more specifically compressed. The contribution $\varphi_i$ generated by the agent i in the adversarial is calculated as follows:

$$\varphi_i = \sum_{i \in c, c \in V} \frac{(c-1)(V-c)!}{V!} (P(c) - P(c - \{i\}))$$

where c represents a possible combination form of the agent i in the multi-agent system, and P(c)−P(c−{i}) represents a marginal utility generated by the agent i in the combination c. After obtaining the adversarial contributions, agents with higher contributions are regarded as the key agents in adversarial with the tested autonomous vehicle at time t, and their possible adversarial effects are emphatically considered during optimization. Therefore, the formula for the adversarial effect function of the multi-agent system is updated as follows:

$$P = \sum_{t}^{t+T} \gamma^t \sum_{i \in V} (\varphi_i [r^t_{self,i}(a_i, p_i), r^t_{group,i0}(a_i, p_i, p_0)]\theta)$$

step 43: adaptively and dynamically adjusting the adversarial intensity.

Since the decision-making algorithm of the tested autonomous vehicle is unknown to a multi-agent swarm adversarial system, the loading of swarm adversarial should start from nothing and gradually increase from weak to strong, so as to test the boundary of the autonomous driving decision-making ability. Using the weight back-propagation update algorithm, according to the real-time behavior of the tested autonomous vehicle and the real-time total objective function of the swarm system, the adversarial intensity is updated, and the formula is as follows:

$$\theta^t = \theta^{t-1} - \mu \frac{\partial (\hat{P} - P)}{\partial \theta^{t-1}}$$

where μ represents the update rate of the adversarial intensity, the greater the value, the faster the change speed of the adversarial intensity, and $\hat{P}$ represents the estimated effect of the tested autonomous vehicle facing the swarm adversarial. When the value is less than the actual adversarial effect P, the tested autonomous vehicle is considered to perform well under adversarial intensity $\theta^{t-1}$, so adversarial intensity $\theta^t$ at the next time is enhanced, and otherwise, it is reduced to realize the adaptive and dynamic adjustment of the adversarial intensity.

step 5: cyclically executing the steps. The correction of inference of the conflict topological graph and the spatio-temporal feasible planning space in the steps 1 and 2, the search for the Nash equilibrium optimal adversarial strategy in the step 3, and the dynamic adjustment of the adversarial intensity in the step 4 are repeatedly executed until the adversarial task is completed.

After the test, according to the trajectory data of the tested autonomous vehicle and the multi-agent swarm, the performance of the tested autonomous vehicle is comprehensively evaluated from multiple aspects such as safety and efficiency. For safety, post encroachment time (PET) is introduced. The post encroachment time specifically refers to the time difference between the rear of the front vehicle and the front of the rear vehicle entering the conflict zone. The conflict zone can be approximately regarded as the intersection point of the actual trajectories of the tested autonomous vehicle and other vehicles. The specific formula for the post encroachment time is as follows:

$$PET = t_{front} - t_{rear}$$

where $t_{front}$ refers to the time when the rear of the front vehicle actually leaves the conflict zone in the conflict relationship, and $t_{rear}$ refers to the time when the front of the rear vehicle actually enters the conflict zone in the conflict relationship. Generally, it is considered that PET<0.7 s is a serious conflict event, 0.7 s≤PET<1.3 s is a general conflict event, 1.3 s≤PET<2.25 s is an ordinary conflict event, and PET≥2.25 s is a potential conflict event. The PET distribution of the tested autonomous vehicle under different adversarial intensities θ is collected, and the safety of the decision-making of the tested autonomous vehicle can be analyzed according to the composition proportion of different types of conflict events.

For efficiency, travel delay is introduced to calculate the difference between the actual passing time of the tested self-driving vehicle and the time in a free flow environment. The specific formula is as follows:

$$t_{delay} = t_{actual} - t_{free}$$

where $t_{delay}$ refers to the delay time of the tested autonomous vehicle, $t_{actual}$ refers to the time the tested autonomous vehicle actually takes to pass through the entire test area, and $t_{free}$ refers to the time required for the tested autonomous vehicle to pass through the test area in the free flow environment.

The electronic device of the present invention includes a central processing unit (CPU) that can execute various appropriate actions and processes according to the computer program instructions stored in a read-only memory (ROM) or loaded from a storage unit into a random access memory (RAM). In the RAM, various programs and data required for the operation of the device can also be stored. The CPU, the ROM and the RAM are connected to each other via a bus. An input/output (I/O) interface is also connected to the bus.

A plurality of components in the device are connected to the I/O interface, including: an input unit such as a keyboard, mouse, etc.; an output unit such as various types of displays, a speaker, etc.; a storage unit such as a magnetic disk, an optical disk, etc.; and a communication unit such as a network card, a modem, a wireless communication transceiver, etc. The communication unit allows the device to exchange information/data with other devices through a computer network such as the Internet and/or various telecommunication networks.

The processing unit executes the various methods and processes described above, such as the method steps 1-5. For example, in some embodiments, the method steps 1-5 can be implemented as computer software programs that are tangibly contained in a machine-readable medium, such as a storage unit. In some embodiments, part or all of the computer programs can be loaded and/or installed onto the device via the ROM and/or the communication unit. When the computer programs are loaded into the RAM and executed by the CPU, one or more of the method steps 1-5 described above can be executed. Alternatively, in other embodiments, the CPU can be configured to execute the method steps 1-5 by any other suitable means (e.g., by means of firmware).

The functions described above herein can be executed, at least in part, by one or more hardware logic components. For example, and without limitation, exemplary types of hardware logic components that can be used include: a field programmable gate array (FPGA), an application-specific integrated circuit (ASIC), an application-specific standard product (ASSP), a system-on-a-chip system (SOC), a complex programmable logic device (CPLD), etc.

The program codes for implementing the method of the present invention can be written in any combination of one or more programming languages. These program codes can be provided to the processor or controller of a general-purpose computer, a special-purpose computer or other programmable data processing apparatuses, so that the program codes, when executed by the processor or controller, cause the functions/operations specified in the flowcharts and/or block diagrams to be implemented. The program codes can be executed entirely on a machine, partially on a machine, partially on a machine and partially on a remote machine as a standalone software package, or entirely on a remote machine or server.

In the context of the present invention, a machine-readable medium can be a tangible medium that can contain or store a program for use by or in conjunction with an instruction execution system, an apparatus, or a device. The machine-readable medium can be a machine-readable signal medium or a machine-readable storage medium. The machine-readable medium can include, but is not limited to, electronic, magnetic, optical, electromagnetic, infrared, or semiconductor systems, apparatuses or devices, or any suitable combination of the above. More specific examples of the machine-readable storage medium can include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

Compared with the prior art, the present invention has the following beneficial effects:
- compared with traditional autonomous driving tests where the sudden failure of a single environmental vehicle is controlled and further the specific single function of the tested autonomous vehicle is detected, the present invention, through the deduction of the conflict topological relationship graph and the feasible planning space, is applicable to all scenarios with driving conflicts, has good scalability, can realize the test requirements of a large number of scenarios, and test the overall capability of the autonomous driving decision-making module.
- in the present invention, the multi-agent swarm adversarial model based on the potential game is established under the feasible planning space according to the correlation between the individual reward of the agent and the swarm adversarial test effect of the multi-agent system. This more realistically reflects the driving conflict relationship existing in the autonomous vehicle, and is convenient for accurately solving and obtaining the optimal adversarial strategy of the multi-agent system against the tested autonomous vehicle.
- in the present invention, the adversarial intensity of the multi-agent system can be dynamically and adaptively adjusted under the condition that the decision-making algorithm of the tested autonomous vehicle is opaque according to the actual behavior of the tested autonomous vehicle. This can realize the tests of different adversarial intensities, thereby fully examining the decision-making ability of the tested autonomous vehicle under different situations.
- in the present invention, the contribution of each agent in the adversarial is obtained by calculating the marginal utility of the vehicle, and the feasible planning space of the tested autonomous vehicle can be compressed more specifically by increasing the adversarial intensity of key agents. This further improves the reliability and accuracy of the solution of the optimal adversarial strategy.
- by using the weight back-propagation update algorithm and adaptively updating the adversarial intensity according to the real-time behavior of the tested autonomous vehicle and the agent system, reliable tests of different adversarial intensities can be achieved.
- in the present invention, the sequential quadratic programming method is adopted to solve the multi-agent swarm adversarial model based on the potential game to obtain the optimal adversarial strategy of the multi-agent system against the tested autonomous vehicle. This meets the requirements of low computing resource consumption and high accuracy.

The above description is merely a specific implementation of the present invention, but the scope of protection of the present invention is not limited thereto. Any person skilled in the art can readily conceive of various equivalent modifications or substitutions within the technical scope disclosed in the present invention. These modifications or substitutions should be encompassed within the scope of protection of the present invention. Therefore, the scope of protection of the present invention shall be determined based on the scope of protection of the claims.

What is claimed is:

1. An autonomous driving test method based on multi-agent swarm adversarial, comprising steps of:

step S1: deducing a conflict topological relationship graph between a tested autonomous vehicle and an agent according to a road topology of a test scenario and a conflict relationship of test objects, specifically comprises:

deducing whether a spatial conflict exists between the tested autonomous vehicle and a multi-agent in an environment, and among multi-agents, based on vehicle state information of a multi-agent vehicle group $\{Veh1, Veh2 \ldots Vehn\}$ and the tested autonomous vehicle Veh0, and test map information; and adopting graph theory to describe a topological relationship of a vehicle conflict to obtain conflict topological relationship graph G=(V,E) of the tested autonomous vehicle and the agent, wherein V represents a set of vehicles, vehicle Vehn had a position of $p_n=(x_n(t),y_n(t))$ and a speed of $v_n(t)$ at time t; and E represents a set of edges, for edge $e_{ij}$, an inference is made according to current position $p_i$ of vehicle Vehi and current position $p_j$ of vehicle Vehj, and if a spatial conflict exists, then the edge is recorded as $e_{ij}=1$, and otherwise, the edge is recorded as 0;

step S2: deducing a feasible planning space of the tested autonomous vehicle according to the conflict topological relationship graph;

step S3: establishing a multi-agent swarm adversarial model based on a potential game under the feasible planning space according to a correlation between an individual reward of the agent and a swarm adversarial test effect of a multi-agent system, and solving and obtaining an optimal adversarial strategy of the multi-agent system against the tested autonomous vehicle, wherein in the multi-agent swarm adversarial model, an adversarial intensity is introduced to characterize relative weights of the individual reward of the agent and the swarm adversarial test effect of the multi-agent system, and the adversarial intensity is adaptively adjusted according to an actual response of the tested autonomous vehicle;

for the establishing a multi-agent swarm adversarial model based on a potential game under the feasible planning space according to a correlation between the individual reward of the agent and a swarm adversarial test effect of the multi-agent system, an expression is:

$$\frac{R_i(a_i^x, p_i, p_0) - R_i(a_i^0, p_i, p_0)}{P(a_i^x, p_i, p_0) - P(a_i^0, p_i, p_0)} > 0, \forall x \in U, \forall i \in V$$

wherein in the expression: $P(a_i^x, p_i, p_0)$ represents a swarm adversarial effect of a multi-agent system of agent i when an adversarial strategy is $a_i^x$, and U is the feasible planning space; $P(a_i^0, p_i, p_0)$ represents a swarm adversarial effect of the multi-agent system of the agent i under any initial adversarial strategy; $R_i(a_i^x, p_i, p_0)$ represents an individual reward of the agent i when an adversarial strategy is $a_i^x$, and $R_i(a_i^0, p_i, p_0)$ represents an individual reward of the agent i under an initial adversarial strategy; and $a_i$ is an acceleration of the agent i, $p_i$ is a position of the agent i, and $p_0$ is a position of the tested autonomous vehicle;

for the individual reward of the agent, a function expression is:

$$R_i(a_i, p_i, p_0) = [r_{self,i}^t(a_i, p_i), r_{group,i0}^t(a_i, p_i, p_0)]\theta$$

$$r_{self,i}^t(a_i, p_i) = a_i - d_{des,i}^t - j_i^t$$

$$r_{group,i0}^t(a_i, p_i, p_0) = \Delta TTCP_{i0}^t = \left|\frac{d_{cp,0}^t}{v_0^t} - \frac{d_{cp,i}^t}{v_i^t}\right|$$

wherein in the expression: $r_{self,i}^t(a_i, p_i)$ represents a driving reward of the agent i at the time t, $a_i$ is the acceleration of the agent i, $p_i$ is the position of the agent i, $d_{des,i}^t$ is a distance between the agent i and an end point, and $j_i^t$ is a jerk of the agent i; $r_{group,i0}^t(a_i, p_i, p_0)$ represents an adversarial reward of the agent i at the time t, $\Delta TTCP_{i0}^t$ represents a time difference between the agent i and the tested autonomous vehicle Veh0 reaching a conflict point at the time t, $d_{cp,i}^t$ represents a distance between the agent i and the conflict point, $v_i^t$ represents a speed of the agent i, $d_{cp,0}^t$ represents a distance between the tested autonomous vehicle and the conflict point, $v_0^t$ represents a speed of the tested autonomous vehicle, and $p_0$ is the position of the tested autonomous vehicle; and $\theta$ is the adversarial intensity to characterize relative weights of the individual reward of the agent and the swarm adversarial test effect of the multi-agent system; and for the swarm adversarial test effect of the multi-agent system, a function expression is:

$$P = \sum_t^{t+T} \gamma^t \sum_{i \in V} (\varphi_i[r_{self,i}^t(a_i, p_i) + r_{group,i0}^t(a_i, p_i, p_0)]\theta)$$

wherein in the expression: $\gamma$ represents a reward reduction coefficient; T is a planning step size; and $\varphi_i$ is a contribution generated by the agent i in adversarial; and step S4: repeatedly executing the steps S1-S3 until an adversarial task is completed.

2. The autonomous driving test method based on multi-agent swarm adversarial according to claim 1, wherein the step S2 specifically comprises: reducing a two-dimensional conflict problem to a one-dimensional car-following problem through a virtual lane projection method according to the conflict topological relationship graph, and deducing a feasible planning space of the tested autonomous vehicle under adversarial of the multi-agent system to characterize the feasible planning space of the tested autonomous vehicle under a current conflict topological relationship by establishing a relationship between longitudinal motion of the vehicle and time.

3. The autonomous driving test method based on multi-agent swarm adversarial according to claim 1, wherein for the contribution generated by the agent i in the adversarial $\varphi_i$, a calculation expression is:

$$\varphi_i = \sum_{i \in c, c \in V} \frac{(c-1)(V-c)!}{V!}(P(c) - P(c - \{i\}))$$

wherein in the expression: c represents a possible combination form of the agent i in the multi-agent system, and $P(c)-P(c-\{i\})$ represents a marginal utility generated by the agent i in the combination c.

4. The autonomous driving test method based on multi-agent swarm adversarial according to claim 1, wherein the adversarial intensity $\theta$ is adaptively and dynamically updated using a back-propagation update algorithm, and an update expression is:

$$\theta^t = \theta^{t-1} - \mu \frac{\partial(\hat{P} - P)}{\partial \theta^{t-1}}$$

wherein in the expression: $\theta^{t-1}$ is an adversarial intensity at time t−1, $\mu$ represents an update rate of the adversarial intensity, and $\hat{P}$ is an estimated effect when the tested autonomous vehicle faces swarm adversarial.

5. The autonomous driving test method based on multi-agent swarm adversarial according to claim 1, wherein in the step S3, a sequential quadratic programming method is adopted to solve and obtain a Nash equilibrium optimal adversarial strategy of the multi-agent system against the tested autonomous vehicle.

6. An electronic device, comprising a memory and a processor, the memory having a computer program stored thereon, wherein the processor, when executing the program, implements the method according to claim 1.

7. An electronic device, comprising a memory and a processor, the memory having a computer program stored thereon, wherein the processor, when executing the program, implements the method according to claim 2.

8. An electronic device, comprising a memory and a processor, the memory having a computer program stored thereon, wherein the processor, when executing the program, implements the method according to claim 3.

9. An electronic device, comprising a memory and a processor, the memory having a computer program stored thereon, wherein the processor, when executing the program, implements the method according to claim 4.

10. An electronic device, comprising a memory and a processor, the memory having a computer program stored thereon, wherein the processor, when executing the program, implements the method according to claim 5.

11. A non-transitory computer-readable storage medium having a computer program stored thereon, wherein the program, when executed by a processor, implements the method according to claim 1.

12. A non-transitory computer-readable storage medium having a computer program stored thereon, wherein the program, when executed by a processor, implements the method according to claim 2.

13. A non-transitory computer-readable storage medium having a computer program stored thereon, wherein the program, when executed by a processor, implements the method according to claim 3.

14. A non-transitory computer-readable storage medium having a computer program stored thereon, wherein the program, when executed by a processor, implements the method according to claim 4.

15. A non-transitory computer-readable storage medium having a computer program stored thereon, wherein the program, when executed by a processor, implements the method according to claim 5.

* * * * *